United States Patent
Whiston et al.

(10) Patent No.: US 7,201,106 B2
(45) Date of Patent: Apr. 10, 2007

(54) HYDROSTATIC HI-RAIL SYSTEM

(76) Inventors: Joseph L. Whiston, 201 NW. 59th Pl., Gladstone, MO (US) 64118; Richard L. Hogan, 1001 Breckenridge, Unit B, Helena, MT (US) 59604

( * ) Notice: Subject to any disclaimer, the term of this patent is extended or adjusted under 35 U.S.C. 154(b) by 4 days.

(21) Appl. No.: 10/345,944

(22) Filed: Jan. 17, 2003

(65) Prior Publication Data

US 2003/0172837 A1    Sep. 18, 2003

Related U.S. Application Data

(60) Provisional application No. 60/365,280, filed on Mar. 18, 2002.

(51) Int. Cl.
*B61C 11/00* (2006.01)
(52) U.S. Cl. .................................. 105/72.2
(58) Field of Classification Search .............. 105/72.2, 105/215.1, 215.2; 104/154; 74/11, 13
See application file for complete search history.

(56) References Cited

U.S. PATENT DOCUMENTS

| | | | |
|---|---|---|---|
| 2,746,615 A * | 5/1956 | Heimaster et al. | 213/212 |
| 2,829,724 A * | 4/1958 | Burns et al. | 180/53.2 |
| 3,709,153 A * | 1/1973 | Herscovitch | 105/72.2 |
| 3,874,306 A * | 4/1975 | Coons et al. | 105/72.2 |
| 3,876,012 A * | 4/1975 | Regier | 172/4 |
| 3,877,390 A | 4/1975 | Wallace | |
| 4,220,215 A * | 9/1980 | Stark | 180/6.7 |
| 4,380,198 A * | 4/1983 | White, Jr. | 105/72.2 |
| 4,534,297 A * | 8/1985 | Johnson, Sr. | 105/90.2 |
| 4,828,452 A | 5/1989 | Bolitho | |
| 4,843,973 A | 7/1989 | Hartelius et al. | |
| 5,016,544 A | 5/1991 | Woollam | |
| 5,088,355 A * | 2/1992 | Sugaya et al. | 477/41 |
| 5,205,220 A | 4/1993 | Wallace | |
| 5,301,615 A * | 4/1994 | Evans et al. | 105/75 |
| 5,756,903 A | 5/1998 | Norby et al. | |
| 5,868,078 A * | 2/1999 | Madison | 105/72.2 |
| 6,352,035 B1 * | 3/2002 | Kashiwase et al. | 105/72.2 |
| 6,533,222 B1 * | 3/2003 | Brooks | 246/28 R |

FOREIGN PATENT DOCUMENTS

| | | | |
|---|---|---|---|
| GB | WO 0047460 A2 * | 8/2000 | |
| JP | 11070808 A * | 3/1999 | |
| JP | 331177 A * | 11/2002 | |

OTHER PUBLICATIONS

DE096759A, Sep. 1982, Derwent, Howarth.*

* cited by examiner

*Primary Examiner*—S. Joseph Morano
*Assistant Examiner*—Robert J. McCarry, Jr.
(74) *Attorney, Agent, or Firm*—Chase Law Firm, L.C.

(57) ABSTRACT

A hydrostatic hi-rail system for use with a railway maintenance vehicle to allow travel along railway rails by raising the vehicle off of road-engaging tires onto rail-engaging flanged rail wheels. The operator controlled system includes front and rear lift assemblies, which are mounted to the front and rear of the vehicle. The assemblies include hydraulic motors, couplers and fail-safe brakes. The system is powered by the vehicle's power source such as an engine and a hydraulic power source such as the vehicle's hydraulic pump.

1 Claim, 14 Drawing Sheets

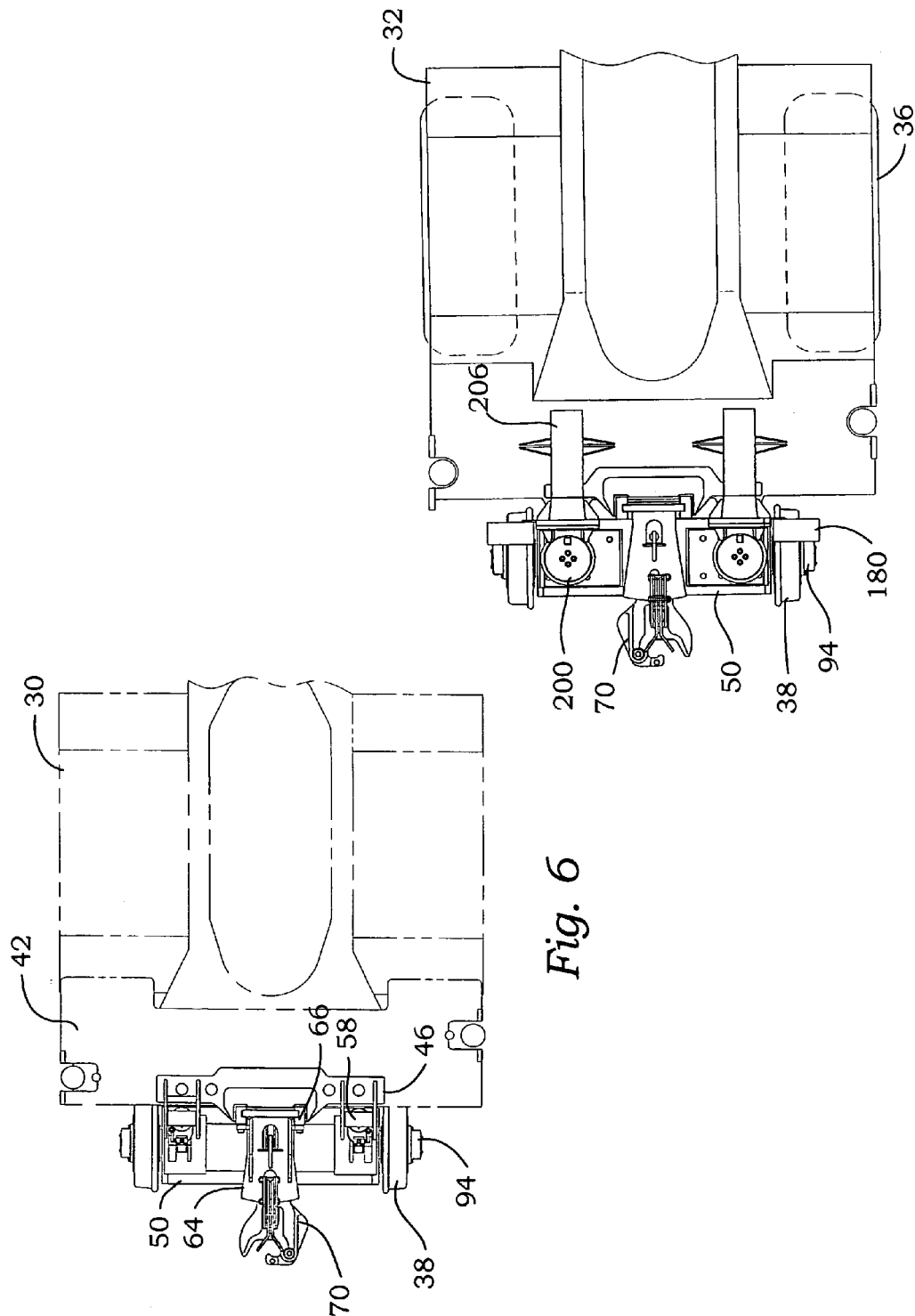

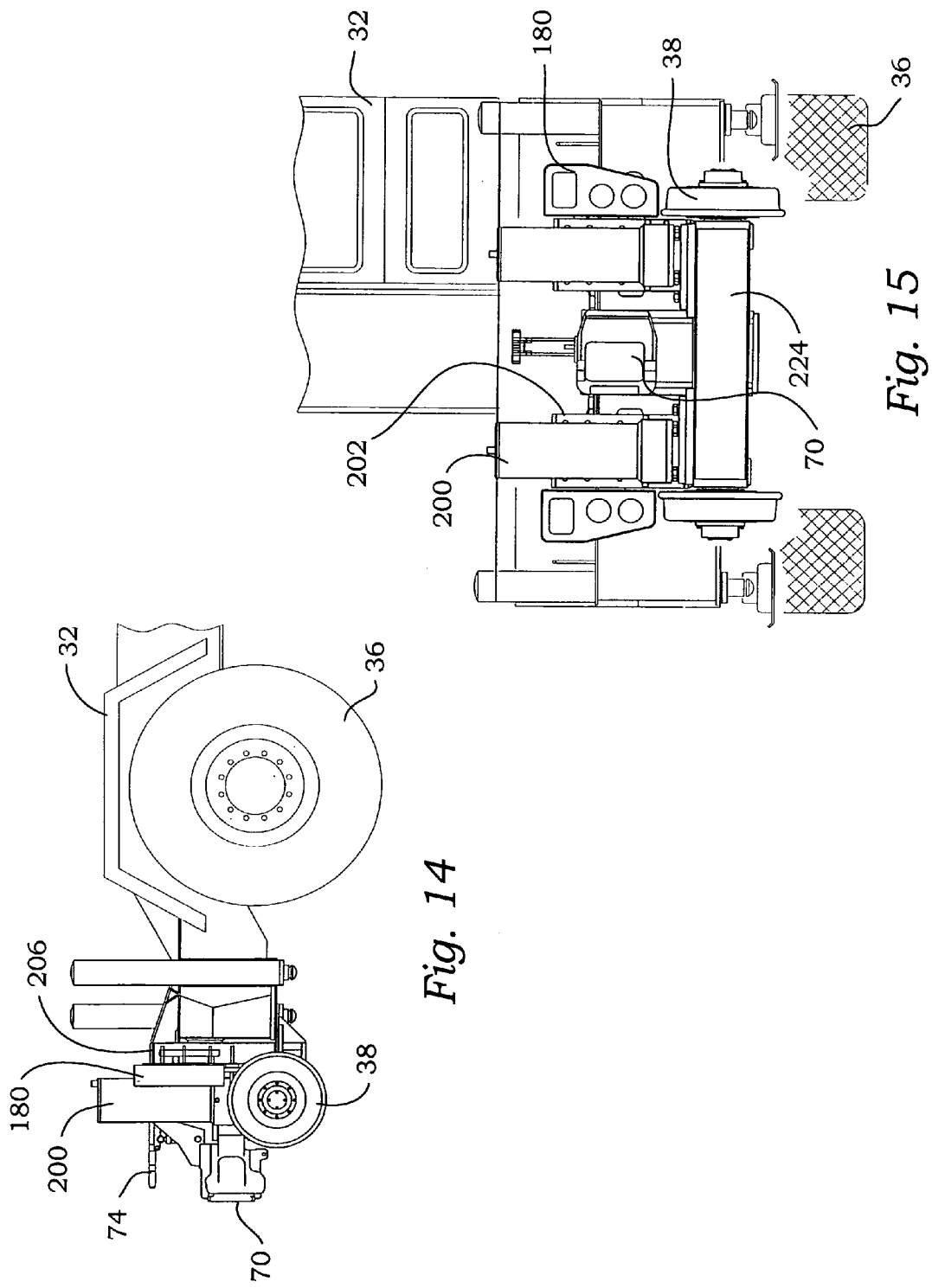

US 7,201,106 B2

HYDROSTATIC HI-RAIL SYSTEM

CROSS REFERENCE TO RELATED APPLICATION

This application claims the benefit of a prior filed, co-pending application Ser. No. 60/365,280, filed Mar. 18, 2002, entitled HYDROSTATIC HI-RAIL SYSTEM.

BACKGROUND OF THE INVENTION

The present invention relates to railway maintenance vehicles and, more particularly, railway maintenance vehicles which are adapted to drive alternatively on the ground or other surface with driveable ground-engaging tires or on railroad tracks on rail-engaging rail wheels allowing selective rail and ground support for the vehicle.

Railway maintenance vehicles having both rail and ground support capabilities with respect to maintenance equipment such as dump trucks, cranes, and the like, have been provided heretofore. One such prior vehicle is shown, by way of example, in U.S. Pat. No. 4,534,297. In a hi-rail position, the tires engage the flanges of the rail wheels to propel the vehicle. In many prior art systems the structure to support the hi-rail equipment is integrated into the structure of the vehicle along with the hydraulic and electrical control systems. In these systems, some of the controls must be reversed when in the hi-rail position because the tires drive the rail wheels in the opposite direction as compared to normal driving position. Control of the hi-rail system is accomplished through the OEM electrical swivel-rings for crane applications. These systems are costly to build, and require extensive modifications to the OEM vehicle. Additionally, the modifications are not readily or easily reversed.

SUMMARY OF THE INVENTION

The present invention includes front and rear lift assemblies which are welded or otherwise secured to the front and rear of a crane or other vehicle frame. When the hydrostatic hi-rail system of the present invention is in the retracted or stored position, the vehicle is propelled using its own drive system and rides on conventional pneumatic tires. To operate on rails such as a railroad track, the vehicle is positioned over a railroad track with the tires straddling the rails. The hydrostatic hi-rail system may then be deployed using a pair of slide-tube hydraulic assemblies at each end of the vehicle until the flanged rail wheels contact the rails and raise the vehicle off of its pneumatic tires and onto the track. Hydraulic motors are coupled to each of the rail wheels to provide power to all four wheels. The system of the present invention uses dynamic braking by controlling the backpressure on the motors with valve control, in addition to friction-type fail safe emergency brakes. Control of the hi-rail functions may be accomplished through the OEM electrical swivel-rings or using a radio link from the vehicle cab to the hi-rail system and a hard-wired braking system. A hydraulically adjustable rail car coupler may be included as part of the system at each end of the vehicle.

BRIEF DESCRIPTION OF THE DRAWINGS

FIG. 6 is a plan view of the left hi-rail lift assembly of FIG. 4;

FIG. 14 is a fragmentary side elevational view of the hi-rail lift assembly of FIG. 13;

FIG. 15 is a fragmentary front elevational view of the hi-rail lift assembly of FIG. 13;

FIG. 16 is a fragmentary plan view of the hi-rail lift assembly of FIG. 13;

DESCRIPTION OF THE PREFERRED EMBODIMENT

Figure 1:
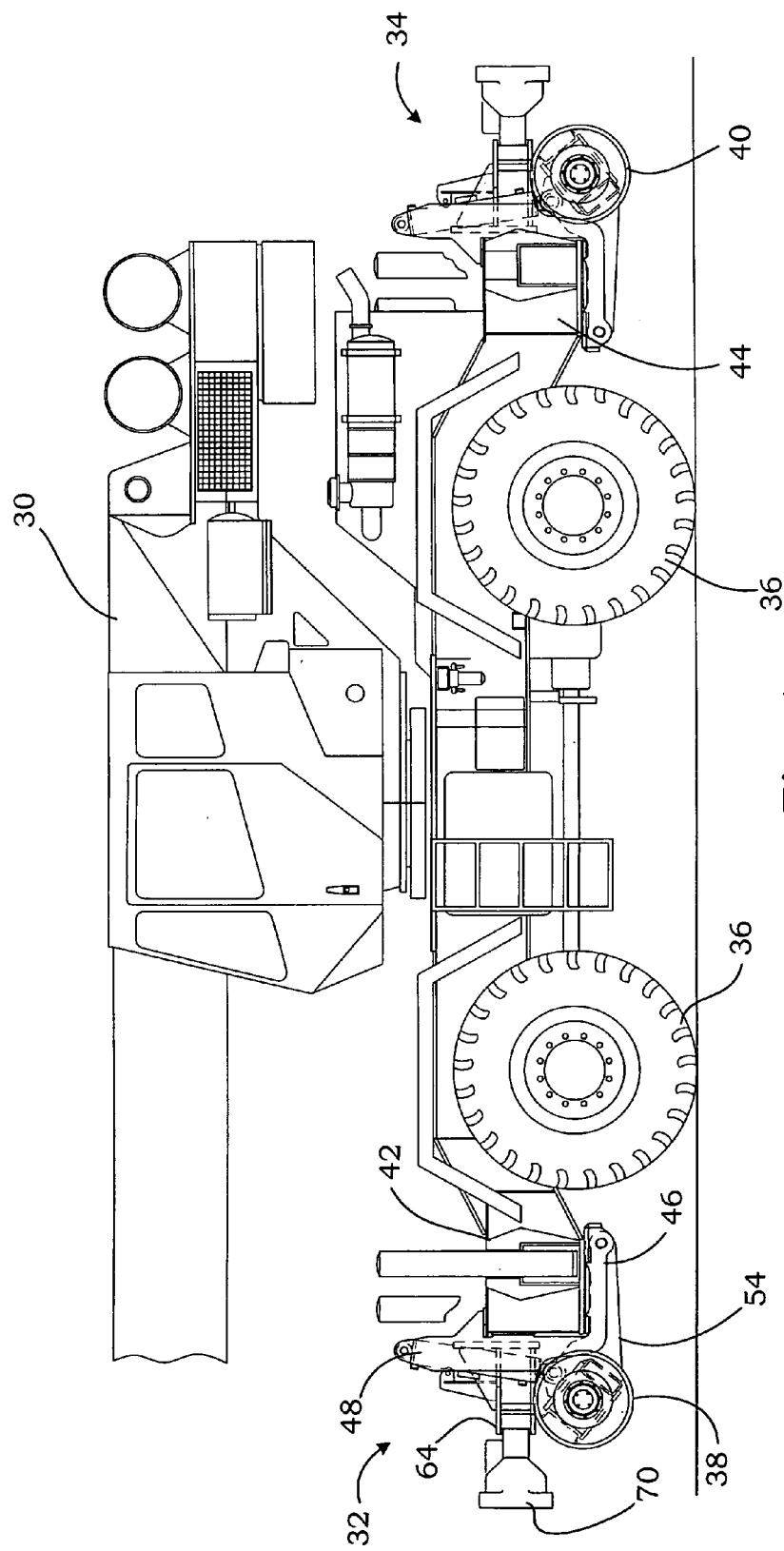
FIG. 1 is a fragmentary side elevation view of a crane showing the hi-rail lift assemblies of the present invention in the retracted or stored position at each end of the crane.
Figure 2:
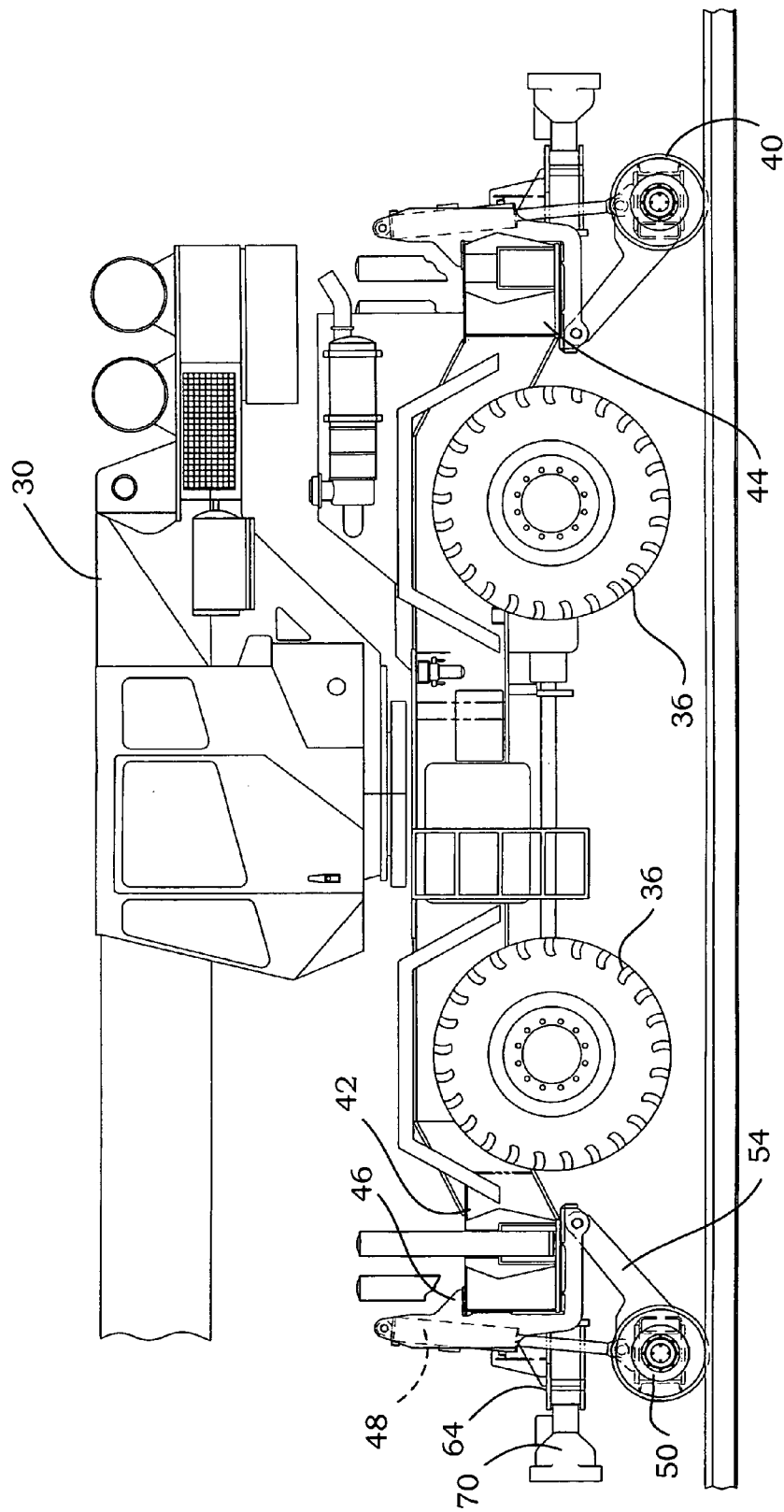
FIG. 2 is the system of FIG. 1 with the hi-rail lift assemblies deployed or extended.

FIG. 1 illustrates a portion of a vehicle 30 with hi-rail lift assemblies 32 and 34 mounted at either end of the vehicle. Vehicle 30 is shown supported by conventional pneumatic tires 36 for normal operation in a conventional manner. Vehicle 30 is shown as a rough terrain type crane, such as a Grove RT 530E crane, for illustration purposes only. FIG. 2 illustrates crane 30 in a rail-mounted mode supported by flanged rail wheels 38 and 40. In a typical installation of the hydrostatic hi-rail system on a rough terrain crane 30, the crane is supported during on-rail operation at two points, one per end of the crane, by hi-rail assemblies 32 and 34 mounted to the crane 30 outrigger boxes 42 and 44, respectively.

Hi-rail assembly 32 is shown in detail in FIGS. 3–6. The following description will refer to the hi-rail assembly 32 only but is equally descriptive of hi-rail assembly 34 which is substantially the same as hi-rail assembly 32.

Hi-rail assembly 32 includes a mounting structure assembly 46, a pair of main lift cylinders 48, an axle box assembly 50, a rail car coupler assembly generally indicated by reference numeral 52 and a radius-arm structure 54 extending under crane 30 outrigger box 42.

Mounting structure assembly 46 may be bolted or welded to the outer surfaces of outrigger box 42. The configuration of the mounting structure assembly 46 is specific to the vehicle.

Main lift cylinders 48 are double-acting type hydraulic cylinders and include a hydraulic lock-valve 56 mounted integrally on each cylinder tube 48. The main-lift cylinder 48 configuration is the same for all vehicles with an operating weight not exceeding the load capacity of the hi-rail hardware.

Figure 3:
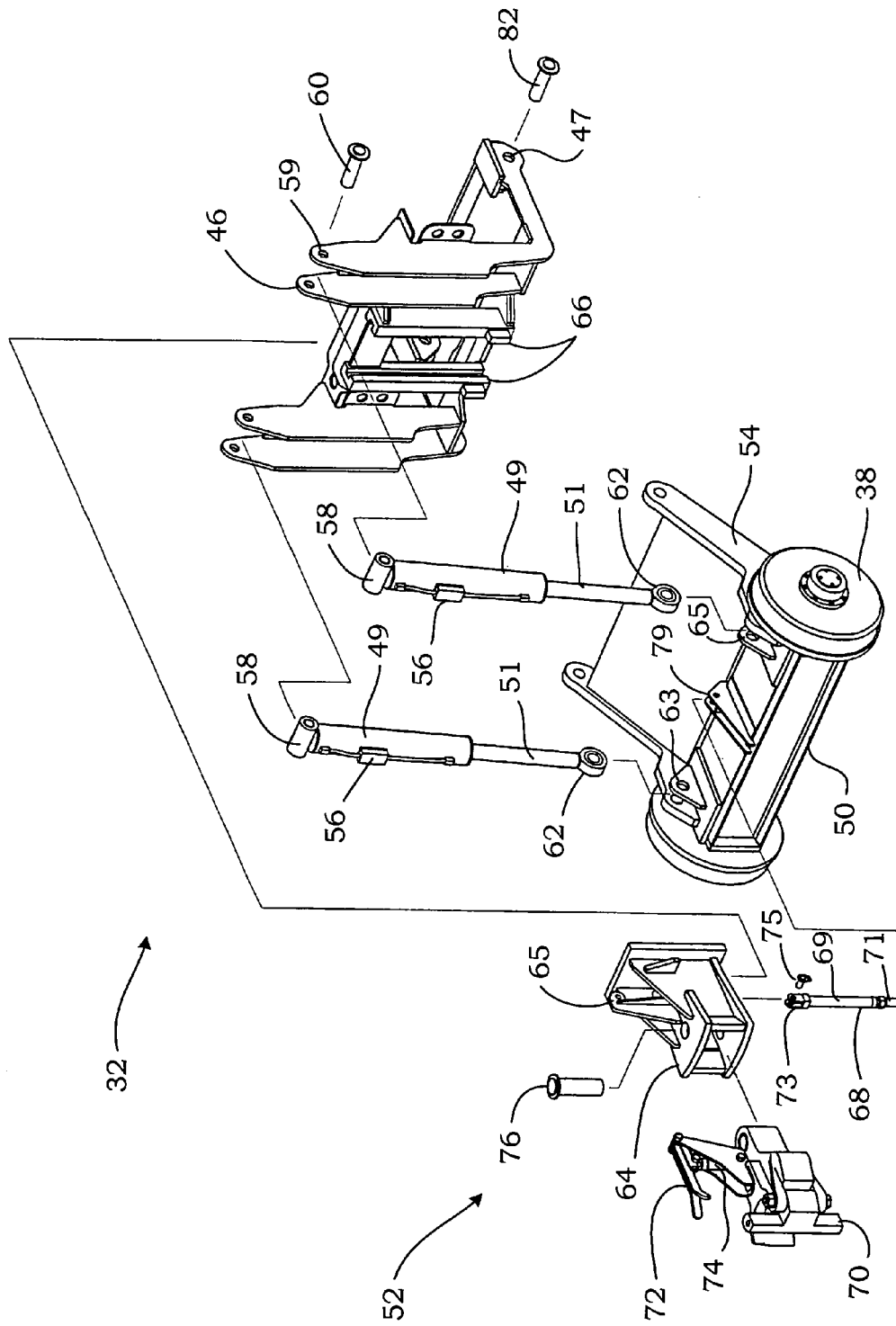
FIG. 3 is an exploded enlarged perspective view of the left hi-rail lift assembly of FIG. 2.

Main lift cylinders 48 each include a cylinder housing 49, and a piston rod 51. The free end of each cylinder housing 49 includes a coupling 58 having a pivot-hole 59 defined therein that is adapted to pivotally couple the free end of housing 49 to mounting structure assembly 46, via the insertion of a conventional structural pivot pin 60 therethrough (only one of the pins is shown in FIG. 3). The free end of each piston rod 51 includes a yoke coupling 62 that is adapted to pivotally couple the free end of piston rod 51 to cylinder pivot hole 63 of axle box bracket 65, via insertion of a conventional pivot pin therethrough (not shown).

Rail car coupler assembly, generally indicated by reference numeral 52, may be included with hi-rail assembly 32 at either end of vehicle 30 to allow rail car towing in both on-tire and on-rail operating modes. Additionally, coupler assembly 52 allows vehicle 30 to be towed as a conventional rail car. Rail car coupler assembly 52 includes a coupler mounting box 64, which is slidably engaged with mounting structure assembly 46 and retained by coupler vertical guides 66. Coupler lift cylinder 68 includes a cylinder having a cylinder housing 69 and piston rod 71. The free end of cylinder housing 69 includes a yoke coupling 73 having a pivot-hole therethrough that is adapted to pivotally couple the free end of cylinder housing 69 to coupler mounting box bracket 65 via insertion of a conventional pivot pin 75 therethrough. The free end of piston rod 71 includes a coupling 77 which is adapted to pivotally couple the free end of piston rod 71 to axle box coupler bracket 79 in a conventional manner. Coupler lift cylinder 68 is pivotally mounted between coupler mount box 64 and axle box assembly 50. Coupler lift cylinder 68 is a double acting hydraulic cylinder capable of supporting the weight of couple mounting box 64 and coupler-knuckle assembly 70 and allows hydraulically-assisted operator adjustment of the coupler 70 height.

Coupler-knuckle assembly 70 includes coupler latch mechanism 72 and coupler latch cylinder 74. Coupler latch cylinder allows coupler latch mechanism 72 to be hydraulically actuated by the operator to remotely control the coupler 52. Coupler-knuckle assembly 70 is pivotally coupled to coupler mounting box 64 by coupler pin 76.

Figure 7:
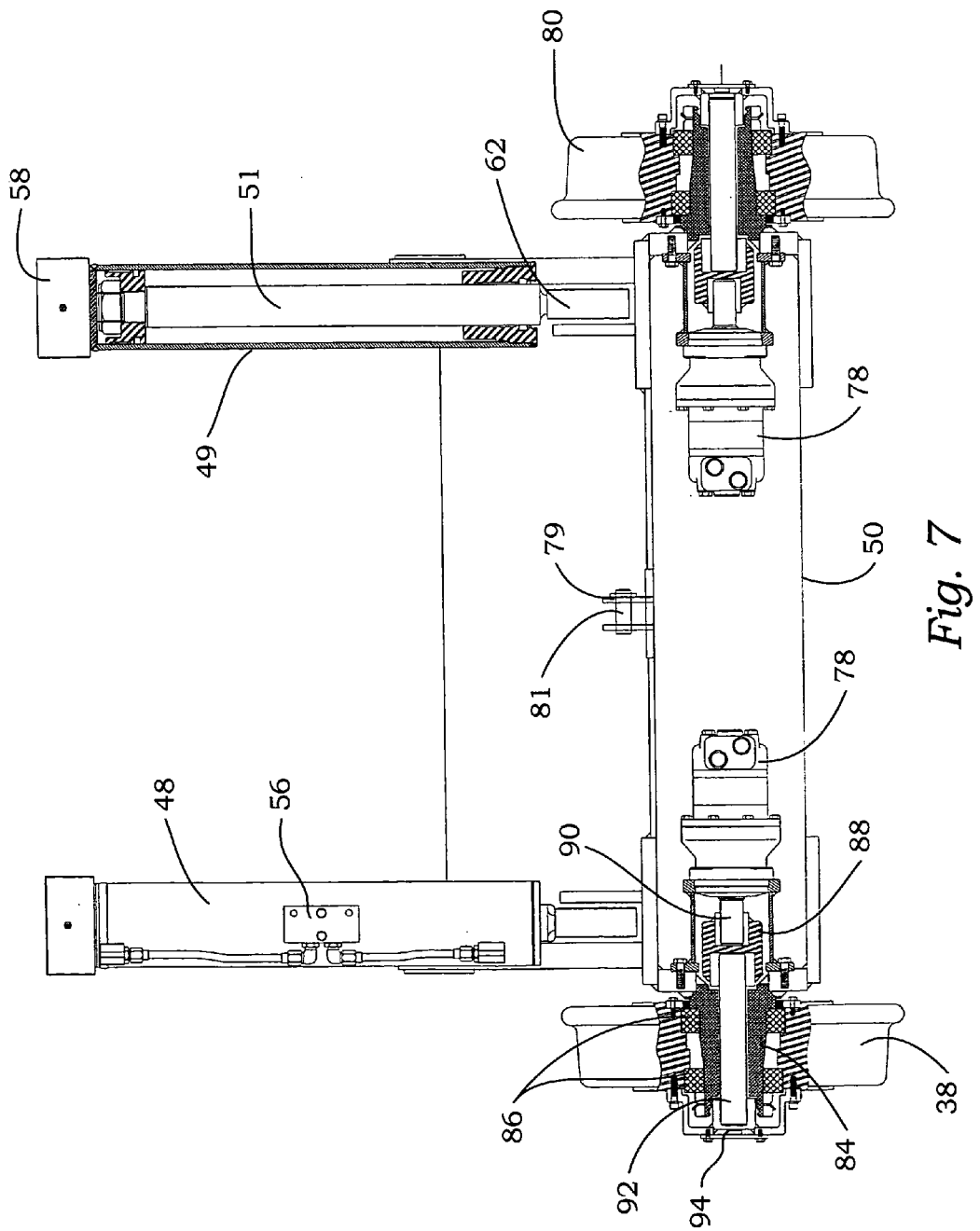
FIG. 7 is a front elevational sectional view of the hydrostatic hi-rail system of the present invention.

Referring to FIG. 7, axle box assembly 50 includes a pair of hydraulic drive motors 78 which power flanged rail wheels 80. Axle box assembly 50 is mounted to radius-arm structure 54, which includes radius-arm holes 55 which are adapted to pivotally couple axle box 50 to mounting structure 46 having a pivot hole 47 therethrough, via insertion of a conventional pivot pin 82 (only right side pin shown in FIG. 3). Axle box assembly 50 may be pivoted from a stored position when vehicle 30 is operating on tires (see FIG. 1), and a hi-rail position when vehicle 30 is operating on-rail (see FIG. 2). Axle box 50 provides a structural connection between rail wheels 80 and mounting structure 46 and provides a protective housing for the hydraulic/mechanical wheel components. The rail wheels 80 are mounted to both ends of axle box assembly 50 on full floating type spindles 84. Each rail wheel 80 is supported by a dual, opposing-style tapered bearing set 86 utilizing a double nut type bearing adjustment.

Each rail wheel 80 is driven by a hydraulic motor 78 coupled directly to the wheel 80 using a spined shaft 88 which couples motor shaft 90 to drive axle 92. Hydraulic motor 78 is a low speed, high-torque type of hydraulic motor known in the art such as Danfoss OMT400. A removable access cover 94 is incorporated as part of the outer wheel hub of wheel 80 to permit on track removal of the drive axle 92 thus allowing non-powered on-rail movement of the hi-rail equipped vehicle.

Figure 8:
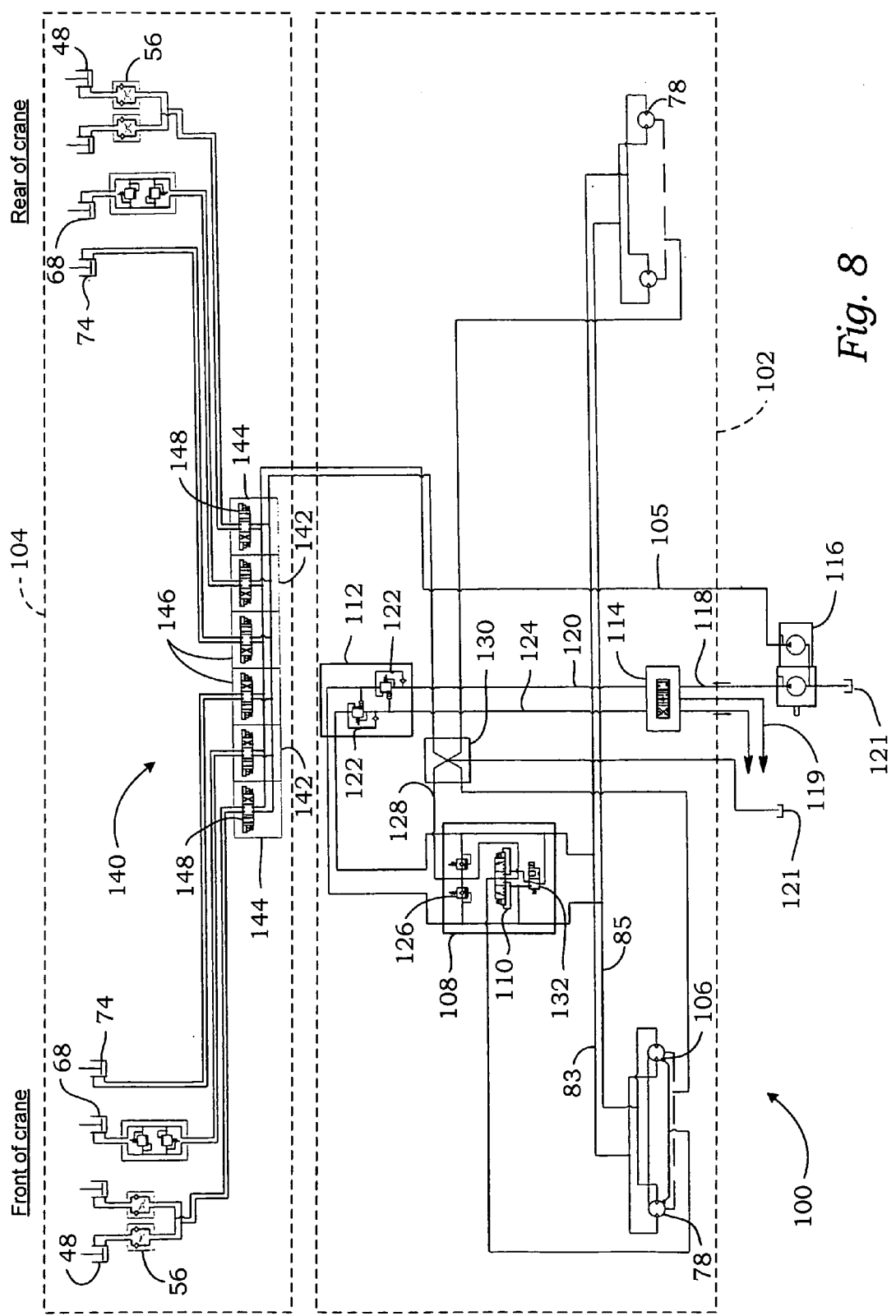
FIG. 8 is a hydraulic schematic illustration of the hydrostatic hi-rail system of the present invention illustrating a single-speed motor control.

Referring to FIG. 8, the hydraulic system for the hydrostatic hi-rail system is generally indicated by reference numeral 100. Hydraulic system 100 includes two separately supplied and controlled subsystems, the wheel-drive hydraulic system 102, and the utility hydraulic system 104.

Wheel-drive hydraulic system 102 includes front and rear drive motors 78 which are schematically illustrated. The drive motors 78 may include fail-safe brakes as indicated by reference numeral 106. Also included in wheel-drive hydraulic system 102 is a wheel-drive emergency brake/motor relief block 108, a fail-safe brake control valve 110, a wheel-drive braking valve 112, and a wheel-drive speed control valve 114.

Figure 9:
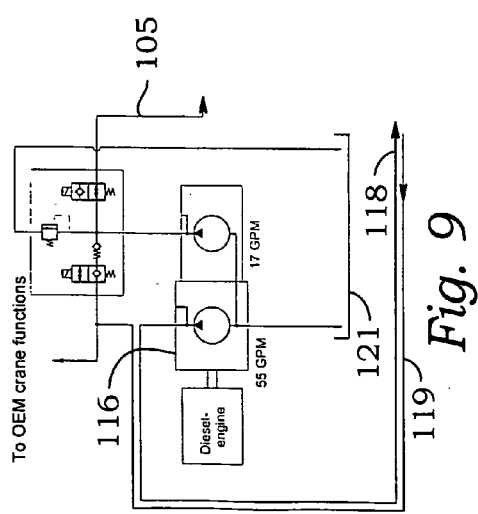
FIG. 9 is a detailed hydraulic schematic illustration of the OEM hydraulic pump.

Referring to FIGS. 8 and 9, the wheel-drive hydraulic system 102 is powered hydraulically using an existing OEM hydraulic pump included with the vehicle as a source. In a typical installation on an RT-type crane, the wheel-drive hydraulic system 102 utilizes the larger of two sections in the main hydraulic pump 116 (typically a constant displacement gear pump), which is normally designed for the boom-lift, boom-telescope, and main/auxiliary-hoist crane function, for example. In an RT-type crane such as a Grove RT530e, this pump 116 is located in a pump drive hole near the top of the transmission and is driven from the engine flywheel. Thus, hydraulic pressure is available for hi-rail use anytime during engine operation.

Figure 10:
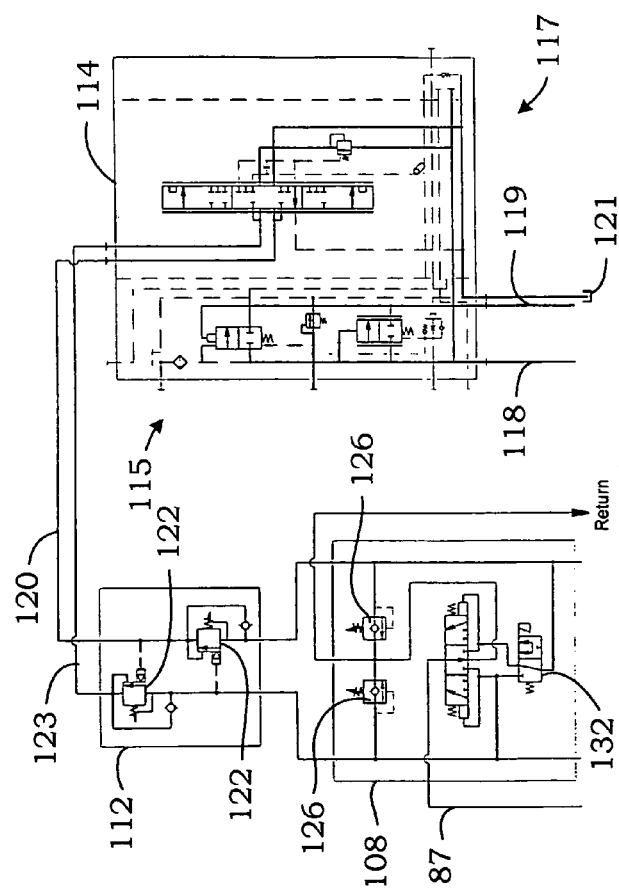
FIG. 10 is a detailed hydraulic schematic illustration of the wheel drive speed/direction control valve block, the braking control valve block and the braking control/relief block.

Referring to FIGS. 8 and 10, the pump 116 outlet flow is diverted on line 118 through a proportional/directional valve 114 providing control of both wheel drive speed and direction. Valve 114 is a sectional-type containing an inlet section generally indicated by reference numeral 115 and a proportional-type directional control section generally indicated by reference numeral 117. One such sectional valve is a Parker MCV16 illustrated in FIG. 8, as an example of a sectional valve providing the directional control function.

The inlet section 115 is equipped with a load sensing pressure-controlled type unloading compensator which functions to divert excess flow, which is the excess pump capacity not utilized for hi-rail use, to a power beyond outlet port on line 119. In the typical hi-rail installation this flow is either returned to the OEM flow path to be utilized for OEM crane function operation or returned to the main hydraulic reservoir 121, depending on the specific configuration of the OEM system.

The directional control section 117 of the valve 114 is two stage utilizing an electrically controlled, primary stage providing pilot pressure control of the secondary (main) stage. Thus, an electrical signal applied to one of the control solenoids on the primary stage results in a proportional movement of the secondary stage valve spool. The secondary stage of the valve utilizes a motor-type spool, i.e., both valve outlet ports (work ports) connect to the reservoir port (tank port) for neutral (centered) spool position.

Operation of the control valve 114 is initiated by an electrical signal applied to one of the primary stage solenoid coils. A pilot pressure, proportional to the applied control voltage, is then produced by the primary stage. This pilot pressure is then applied to either end of the secondary spool, resulting in its deflection from neutral (center) position. Movement of the secondary spool in either direction results in a load sense pressure being applied to the inlet section 115 pressure compensator enabling pump flow to be diverted into the directional control section 117 and this pump flow to be directed into the appropriate valve outlet port (work Port) to be send to the wheel drive motors. Return of the secondary spool to the neutral position results in the flow being restricted to the outlet port(s) and is instead diverted to the power beyond port on line 119.

Flow exiting the wheel drive speed/direction control valve 114 is directed on line 120 or 123 to braking control block 112 through an inline-type block in which is mounted a pair of counterbalance cartridge-type valves 122. These valves 122 are a pilot-assisted, counterbalance type mounted in a cross piloted configuration. Pilot ratio for the valves is 10:1 for example, but other ratios may be used.

Figure 11:
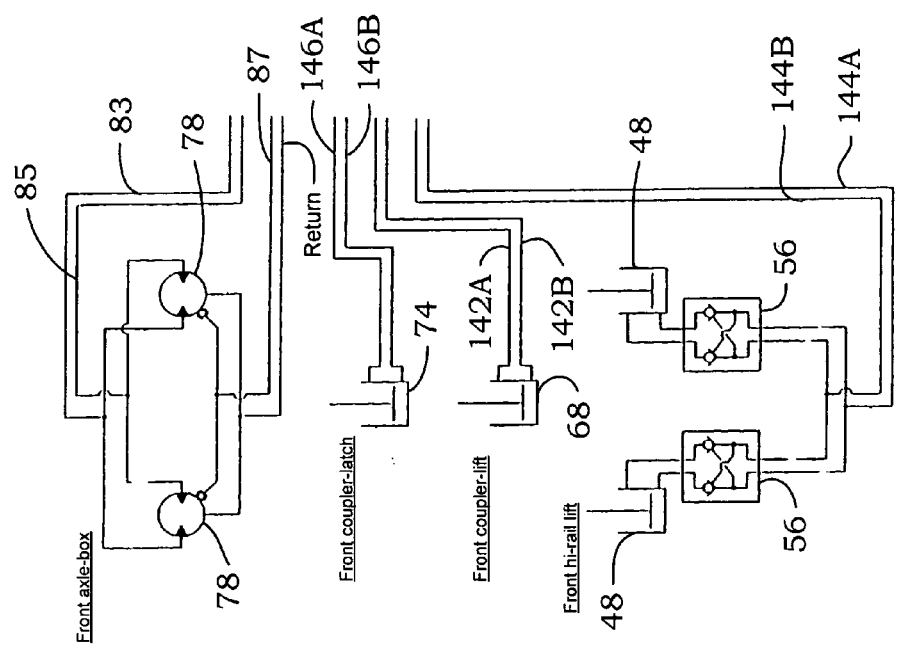
FIG. 11 is a detailed hydraulic schematic illustration of the major lift assembly components.

Referring to FIGS. 8, 10 and 11, rail wheel braking is achieved through return line 83 or 85 depending on the direction of travel) backpressure of the drive motors 78. Two conditions should be present for a backpressure situation to exist. First, the drive motors 78 should be driven by the motion of the crane, thereby generating a flow in the return line. Second, the secondary spool in the wheel drive control valve 108 should be in a centered position (neutral position) so that the positive drive pressure is not present at either of splitter-block inlet ports. In this situation, both counterbalance valves 122 would be closed, thus generating a positive pressure in the return line 83 or 85, the magnitude of which would be dependent on the counterbalance spring setting (externally adjustable). Dynamic braking is achieved for both directions of travel by virtue of the dual valve configuration 112.

During normal motor operation which is motor operation under positive load, i.e., acceleration or steady speed operation, the counterbalance valve 122 in the return line is held in an open position by the pilot assist feature included in the valves. The pilot pressure required to hold each valve 122 open is obtained through a cross passage connected to the opposite inlet port. Return line flow is then allowed to return from the drive motors unrestricted to the wheel drive control valve 114. Thus, wheel drive pressure, present at any time, present at any time pressure is applied to one of the inlet ports on the braking control block 112, acts to open the counterbalance valve 122 in the opposite port.

The motor pressure relief/emergency brake control block 108 provides pressure protection to the rail wheel drive motors 78 in the event of overload, or wheel slippage resulting in fluid shock, for example. Use of a dual valve 126 configuration ensures motor over pressure protection for both directions of travel as well as for both motor flow path configuration (series/parallel). Both of the relief valves 126 relieve to a common reservoir passage 128. This passage 128 is connected to the crane main reservoir manifold 130. Emergency brake control function is included within the same block 108, using a solenoid-controlled two-position valve 132.

A brake release valve 110 is included to control disengagement of the spring applied fail safe emergency brakes 106, located in the front axle box 50. Control pressures, sensed from the motor supply lines are applied as inputs to the brake release valve on line 87. The pressure differential between these control pressures determine the operational state of the brake units 106. For the case of the two pressures being equal (either zero or some value other than zero), no release pressure is applied to the brake units and the brake units 106 remain locked (rail wheels 38 are locked). Alternatively, a pressure differential of 80 psi or greater existing between the control pressures would result in a release pressure being applied to the brake units 106 by the brake release valve 110 thereby unlocking the spring applied brakes 106 and allowing rotation of the rail wheels 38. All valves contained within block 108 are a replaceable cartridge type.

One drive motor 78 is coupled to each rail wheel in a direct drive type configuration. All of the hydraulic wheel drive motors 78 are identical in displacement and are of a low speed/high torque type. Two of the four drive motors include an integral spring applied fail safe brake 106 (shown in FIGS. 8 and 11 for front axle box only).

The wheel drive hydraulic system utilizes the OEM crane hydraulic oil supply, including the reservoir and filtration system. As a consequence, maintenance specific to the hi-rail system, such as dedicated hydraulic oil filters, is not required.

Figure 12:
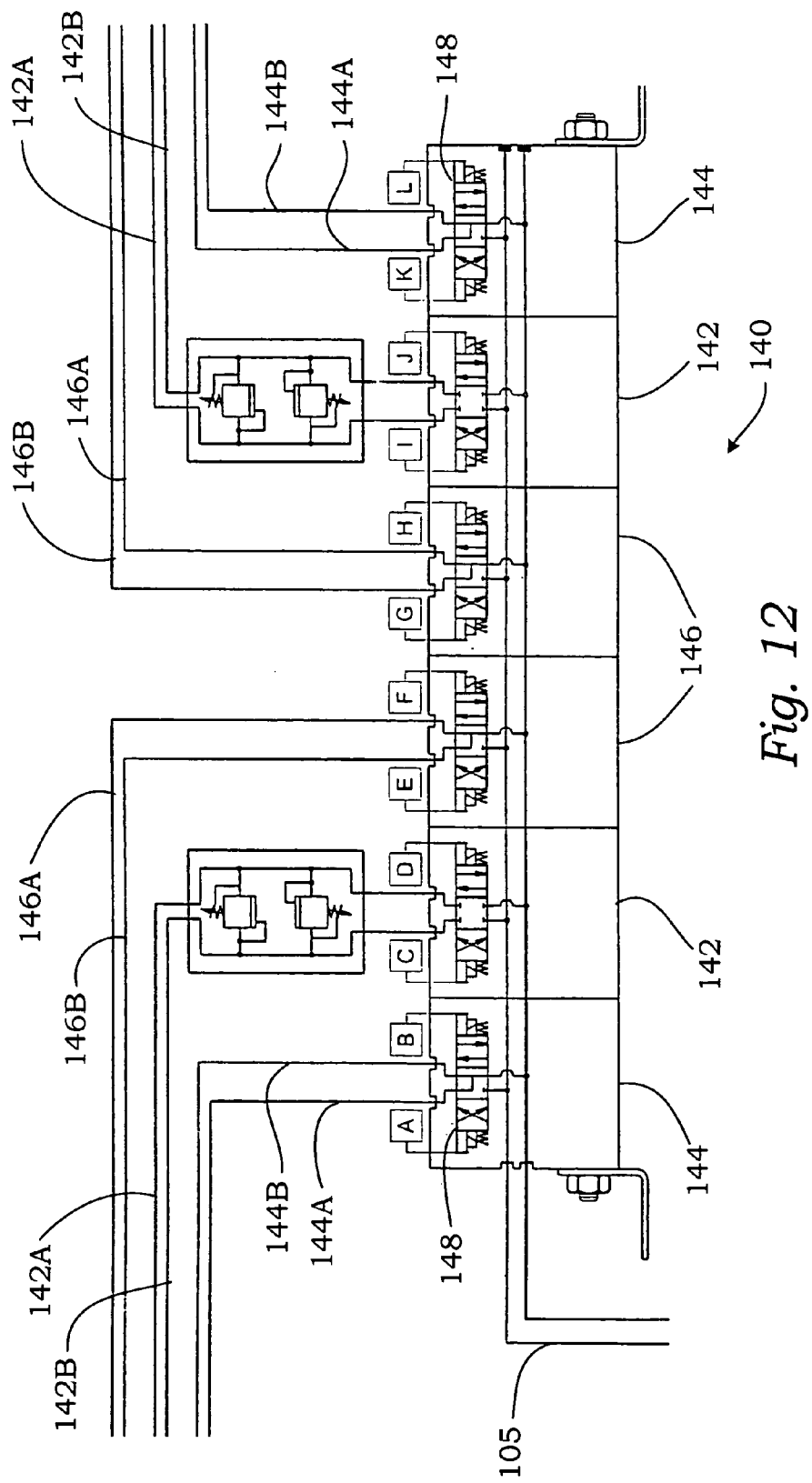
FIG. 12 is a detailed hydraulic schematic of the valve control block.
Figure 13:
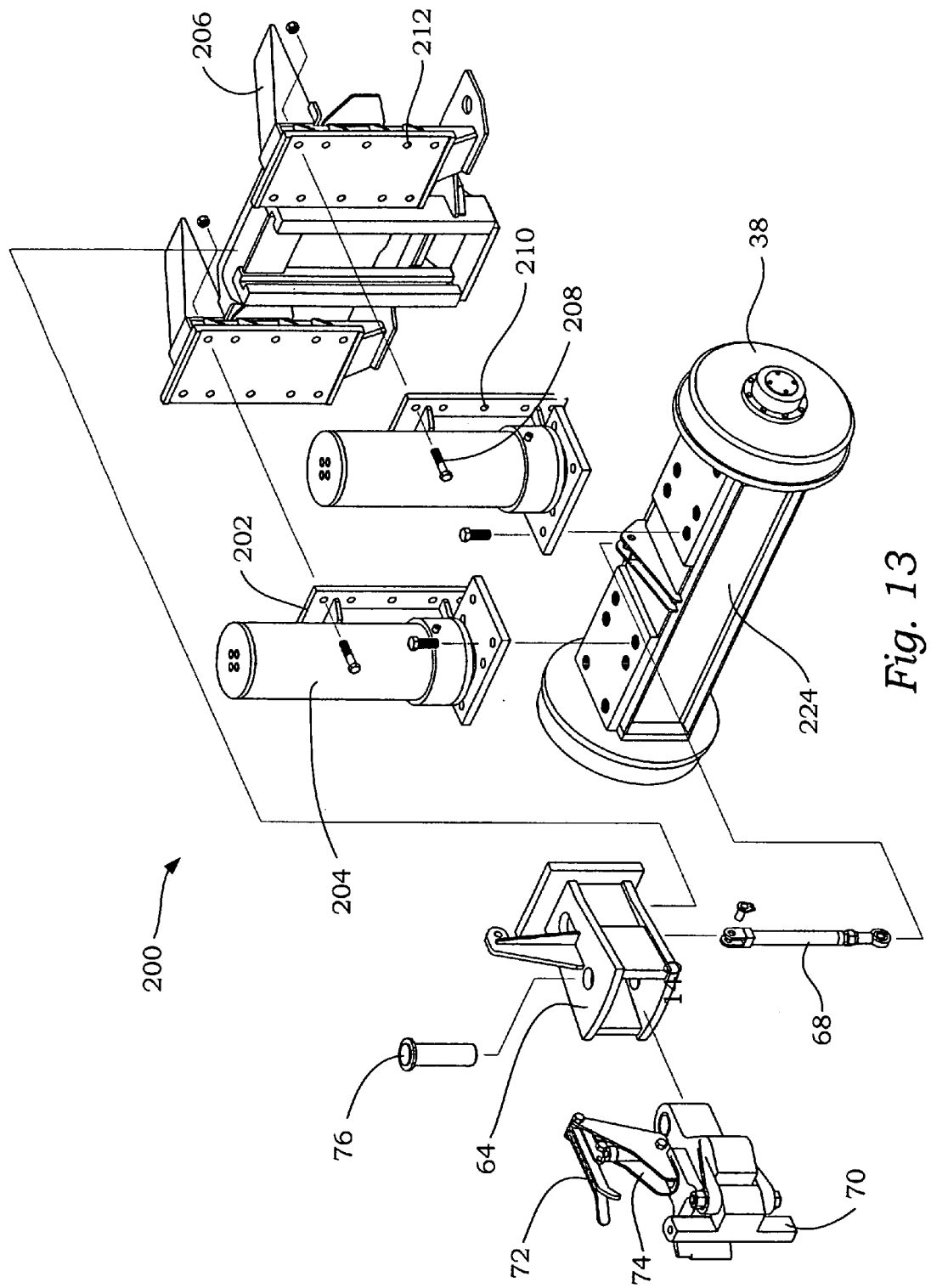
FIG. 13 is an exploded view of an alternate embodiment of the hi-rail lift assembly.
Figure 17:
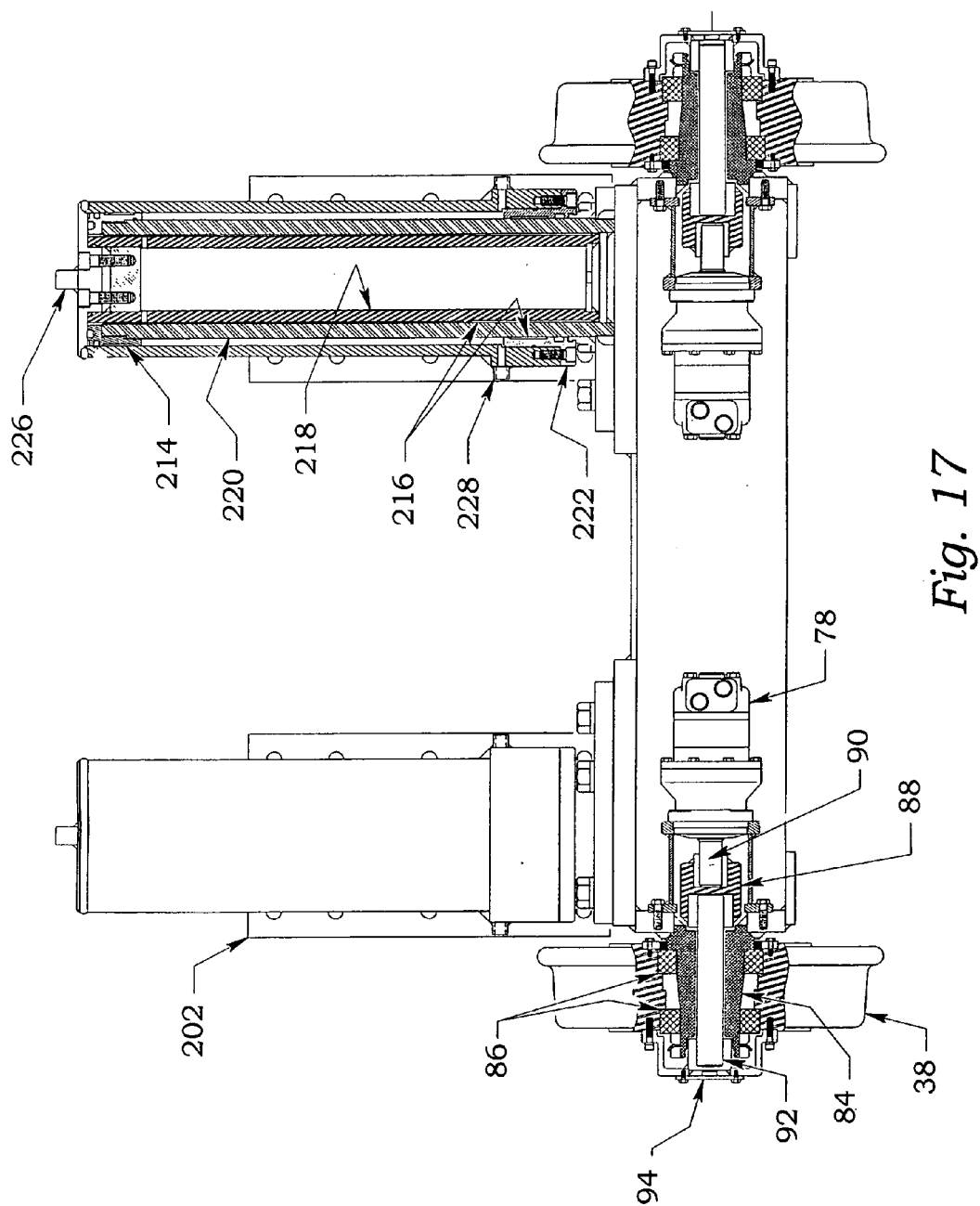
FIG. 17 is an enlarged sectional view of the hi-rail lift assembly of FIG. 15.

Referring to FIGS. 8, 11 and 12, the hi-rail utility hydraulic system 104 provides a hydraulic supply to hi-rail functions other than the rail wheel drive including main lift cylinders 48, coupler latch cylinders 74 and coupler lift cylinders 68, which are controlled by utility hydraulic control valves 140.

The hi-rail utility hydraulic system 104 is hydraulically supplied using an existing (OEM) hydraulic pump as a source on line 105. In a typical installation on an RT-type crane, the utility hydraulic system 104 utilizes the smaller of two sections in the main hydraulic pump 116, a section normally designed for crane steering (utilizing a priority valve), and outrigger functions.

The utility hydraulic control valves 140 include multi-sectional type solenoid valves (six sections total) mounted in a single parallel circuit valve bank. In a typical installation, the hi-rail utility-hydraulic valve bank 140 is integrated with the OEM-outrigger control valve bank (not shown) allowing use of the OEM solenoid-type unloading valve for hi-rail functions in addition to OEM outrigger functions. Each of the individual valve sections associated with the control of the coupler lift functions 142 on lines 142A and 142B (two sections) utilizes a closed center-type spool. The remaining valve sections (four sections), associated with the control of the main lift 144 on lines 144A and 144B and coupler latch functions 146 on lines 146A and 146B, utilize a motor-type spool, i.e., both valve outlet ports or work ports connect top the reservoir port or tank port for neutral or centered spool position. All valve sections are a double acting type and utilize a separate solenoid for each direction of operation.

An electrical signal must be simultaneously applied to both the OEM unloading valve (not shown) and to one of the solenoids corresponding to the particular valve section of interest in order to activate one of the utility hydraulic functions (shown as boxes A–L in FIG. 12).

The main lift cylinder circuits include a pilot operated lock valve 56 in the cylinder lines between the valve section and the cylinder ports. This type of valve assembly serves to "lock" the main lift cylinders in a particular position by hydraulically blocking the flow in the cylinder lines by means of a pilot operated relief in each line. The relief valves 148 are installed within the valve assembly block 144 in a cross piloted configuration. Thus, application of pressure to either inlet port (by the main lift control valve 144) serves to effectively lower the relief valve 148 setting in the opposite port (exit port), allowing the cylinder 48 to be moved with reduced pressure. Pilot ratio for each lock valve 56 is approximately 4:1.

The coupler lift/latch system system consists of two independently operated, double acting cylinders per end of crane: the coupler lift cylinder 68, and coupler latch cylinder 74. The coupler lift cylinder 68 allows vertical adjustment of the coupler height as a compensation for variation in crane coupler operating height due to hi-rail operating configuration (on tire versus on rail) or varying crane elevation height above the top of the rail during on-rail operation.

The coupler latch cylinder 74 allows the coupler knuckle 70 to be opened by remote control from the operator's cab. Extension of the coupler latch cylinder 74 lifts the coupler latch lever 72 (located on the top of the coupler knuckle), which is connected directly the internal latch mechanism, thus opening the coupler knuckle. Alternatively, the knuckle 70 can be unlatched without hydraulic assistance by manually actuating the coupler latch lever 72.

As with the hi-rail wheel drive system, the hi-rail utility hydraulic system utilizes the OEM crane hydraulic oil supply, including the reservoir and filtration system. As a consequence, maintenance specific to the hi-rail system, such as dedicated hydraulic oil filters is not required.

Figure 5:
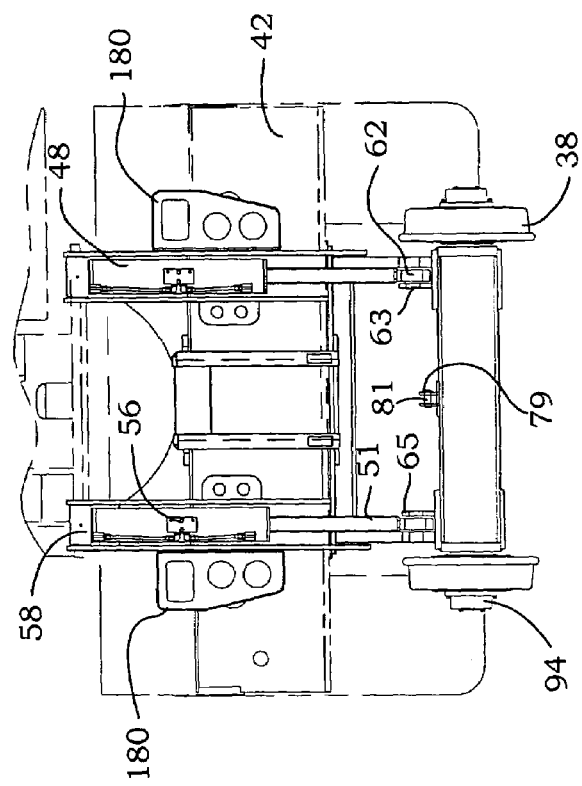
FIG. 5 is a front elevation view of the left hi-rail lift assembly of FIG. 4.
Figure 4:
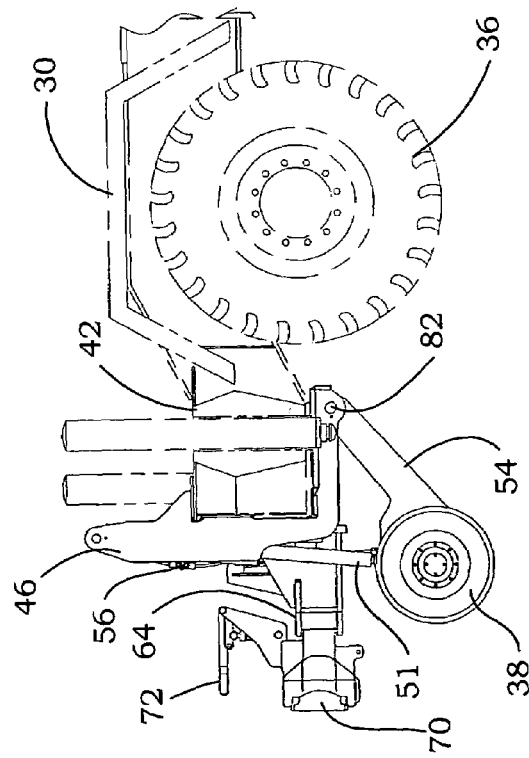
FIG. 4 is a fragmentary enlargement of the left hi-rail lift assembly of FIG. 2.

An independent hi-rail electrical system, included as part of the hi-rail installation provides electrical control of the hi-rail hydraulic system, and control of the hi-rail lighting system, a system for on track hi-rail use which replaces the OEM lighting system (as shown in FIG. 5, lights 180). Modification of the OEM electrical system to control hi-rail systems is generally known in the art and is disclosed herein.

Although the electrical system is largely independent from the OEM wiring harness, a limited number of connections are made to the OEM lighting harness in order to utilize existing in cab lighting controls (turn signals, marker lights and headlights).

Operator control of the hi-rail hydraulic system is achieved using electrical solenoid valves for all functions. Two types of electrically controlled hydraulic valves are utilized in the hi-rail system: (1) directional control type for the main lift, coupler latch, coupler lift and (2) a proportional directional type for the wheel drive. Both types are a dual coil type design.

Hi-rail functions controlled from the operator's cab include wheel drive, main lift cylinders and coupler latch cylinders. The coupler lift cylinders are controlled from the ground using toggle switch controls located near the corners of the crane. This switch position allows superior visibility of the coupler height relative to a rail car coupler being coupled to the crane.

Operator control of the wheel drive may be provided through two electrical swivel slip rings using two proportional channels. These channels are current regulated (0–1.8A) and use a dither frequency of 50 Hz as is known in the art. Operator control of the main lift cylinder is provided by spring centered toggle switches located on the four corners of the crane. Control current through the solenoid coils is direct current (DC). Operator control of the coupler latch cylinders may be provided through two electrical swivel slip rings. Control current through the solenoid coils is direct current (DC). Operator control of the emergency brake solenoid valve may be provided through a single electrical swivel slip ring. Control current through the solenoid coil is direct current (DC). In the normal state (non-energized) the solenoid valve allows the parking brakes to function as an automatic, spring applied, pressure released parking brake. Application of a control voltage to the solenoid valve by the operator serves to apply the brakes, regardless of travel speed or direction.

The hi-rail electrical wiring harness is comprised of a single, centrally located connection box with control cabling diverging outward to each point of connection (electrical component or otherwise). The central connection box is a sealed type, as are the other components. Connection of the electrical cabling is accomplished using multi-pin quick disconnect type electrical plugs.

The hi-rail lighting system is comprised of two complete headlight/marker/tail light systems, one system facing each end of the crane. These systems are activated/deactivated depending on the direction of on-rail crane travel. Control of this function originates from the electrical signals applied to the control coils on the main wheel drive speed/direction control valve. The OEM turn signal system remains intact and is functional during on-tire operation in a forward direction of travel only.

Control of the direction of the headlight/marker/tail light system is achieved using the electrical signal(s) originating from the hi-rail wheel drive hand controller (located in the operator's cab), present to provide direction/speed control of the hi-rail wheel drive. These signals are applied to the hi-rail lighting system direction control inputs. Thus, deflection of the wheel drive hand control in either direction results in the hi-rail lighting system direction to be oriented in the same direction. In the reversed configuration, headlights and marker lights (amber) appear on the rear end of the machine, tail lights (red) appear on the front end. Placement of the wheel drive control in either the forward or neutral positions results in the lighting to be restored to a standard (forward facing) configuration.

Referring to FIGS. 13–17, another embodiment of the present invention is shown and described hereinbelow. Main lift cylinder assemblies 200 are double-acting type hydraulic cylinders utilizing a bolted head welded construction design to provide both lifting and rail wheel location functions. A mounting pad 202 with attendant support structure is welded to the cylinder tube 204 providing a bolted mounting interface for cylinder attachment to the mounting structure assembly 206. Mounting structure assembly 206 is similar to mounting structure 46 discussed hereinabove.

Each main lift cylinder assembly 200 is rigidly secured to the mounting structure 206 with ten high-strength bolts 208 through holes 210 in the mounting pad 202 which are axially-aligned with holes 212 in the mounting structure assembly 206, and thus may be removed for repair or to rebuild a cylinder. In order to provide the necessary lateral rod support necessary to handle the drive wheel loading, cylinder assembly 200 includes an increased wear-band length 214 on both the piston outer diameter 214 and the head inner diameter 216, and an inner rod support 218 to provide an increase in the wear band support area for rod 220. Rod 220 has a free end, which extends from cylinder head 222 and is bolted to axle box assembly 224. Rod 220 is extended from cylinder housing 204 by applying hydraulic pressure to extend port 226, and is retracted by applying hydraulic pressure to retract port 228 in a conventional manner. Axle box assembly 224 is similar to axle box assembly 50 discussed hereinabove.

Figure 19:
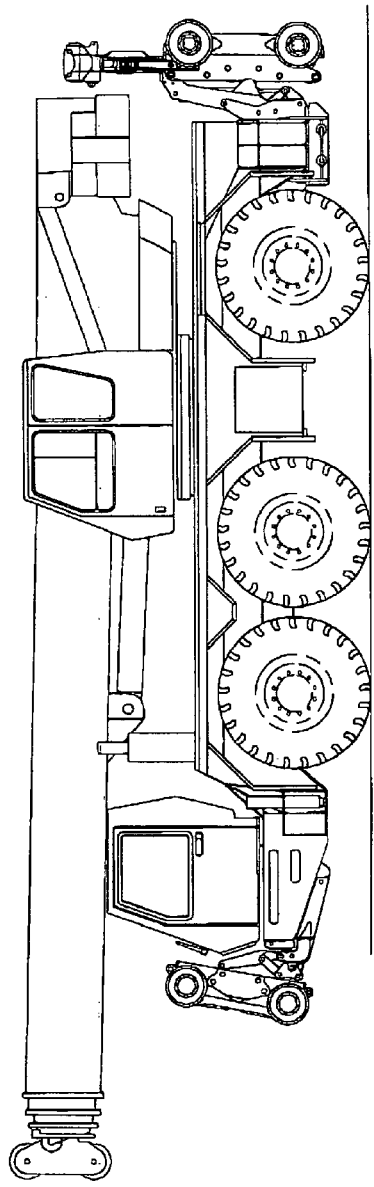
FIG. 19 is another alternate embodiment of the hi-rail lift assembly shown in the stored position.
Figure 20:
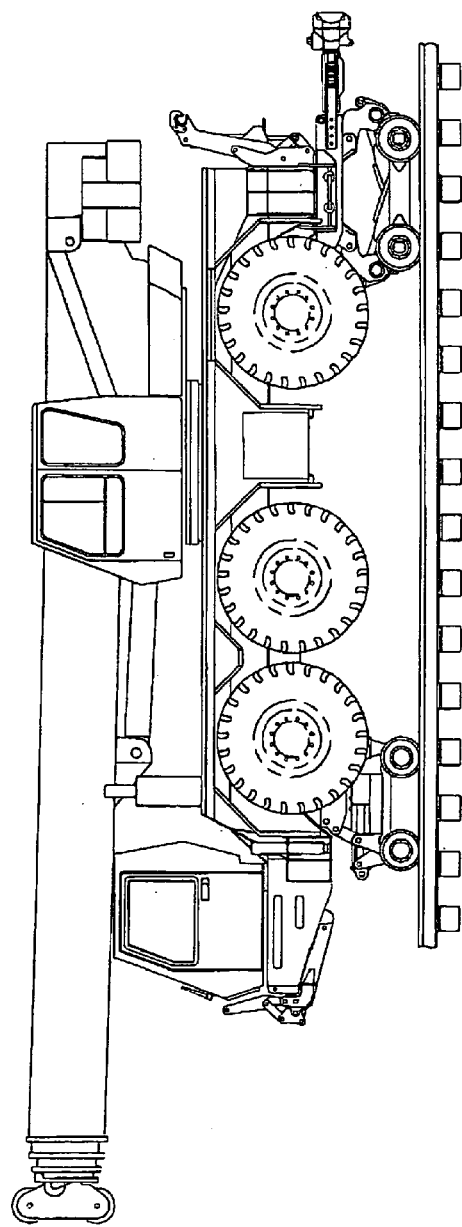
FIG. 20 is the alternate embodiment of FIG. 19 shown in the on-rail position.

A four-wheel embodiment of the hi-rail lift assembly is shown in FIGS. 19 and 20 installed on a Grove 3050 crane. The four-wheel lift assemblies 300 and 302 each utilize a scissors type lift mechanism that allows the assembly to swing to the front and rear of the crane, respectively. The rear assembly 302 includes four hydraulically driven rail wheels as described hereinabove. The front assembly 300 includes four freewheeling wheels.

Operator control of the hydrostatic hi-rail system of the present invention is achieved using electrically actuated solenoid or hydraulic pilot control valves for all functions. In addition to the conventional control of the system for a crane utilizing spare electrical slip rings or slip rings not utilized in the on-rail mode, the hydrostatic system of the present invention may be operated utilizing a radio controlled link to the hi-rail components described hereinabove. Hi-rail functions controlled from the operator's cab include wheel drive, main lift cylinders and coupler latch cylinders. The coupler lift cylinders are controlled from the ground using toggle switch controls located near the corners of the crane, for example, to allow superior visibility of the coupler height relative to a rail car coupler being coupled to the crane.

Operator input for hi-rail functions requiring control from the operator's cab is relayed from the rotating turret, a typical characteristic of a rough terrain crane, to the crane chassis via a conventional radio control system. The system includes a transmitter, located in the cab, and a receiver located in a protective enclosure on the crane chassis. Use of this type of system allows use of all crane hydraulic functions in the on-rail position, and avoids using the electrical slip rings in the turret electrical swivel assembly. The electrical power source for both the transmitter and receiver units originates in the cab. A single non-used slip ring, which is typically available in most cranes, is used to transmit the power source for the receiver from the turret to the chassis. The receiver has sufficient current capacity to directly operate all types of solenoid valves utilized in the hydrostatic hi-rail system described hereinabove, thus alleviating the requirement for intermediate control relays. Each dual-coil solenoid valve (directional type) requires two radio control channels to operate (one channel per coil).

Figure 18:
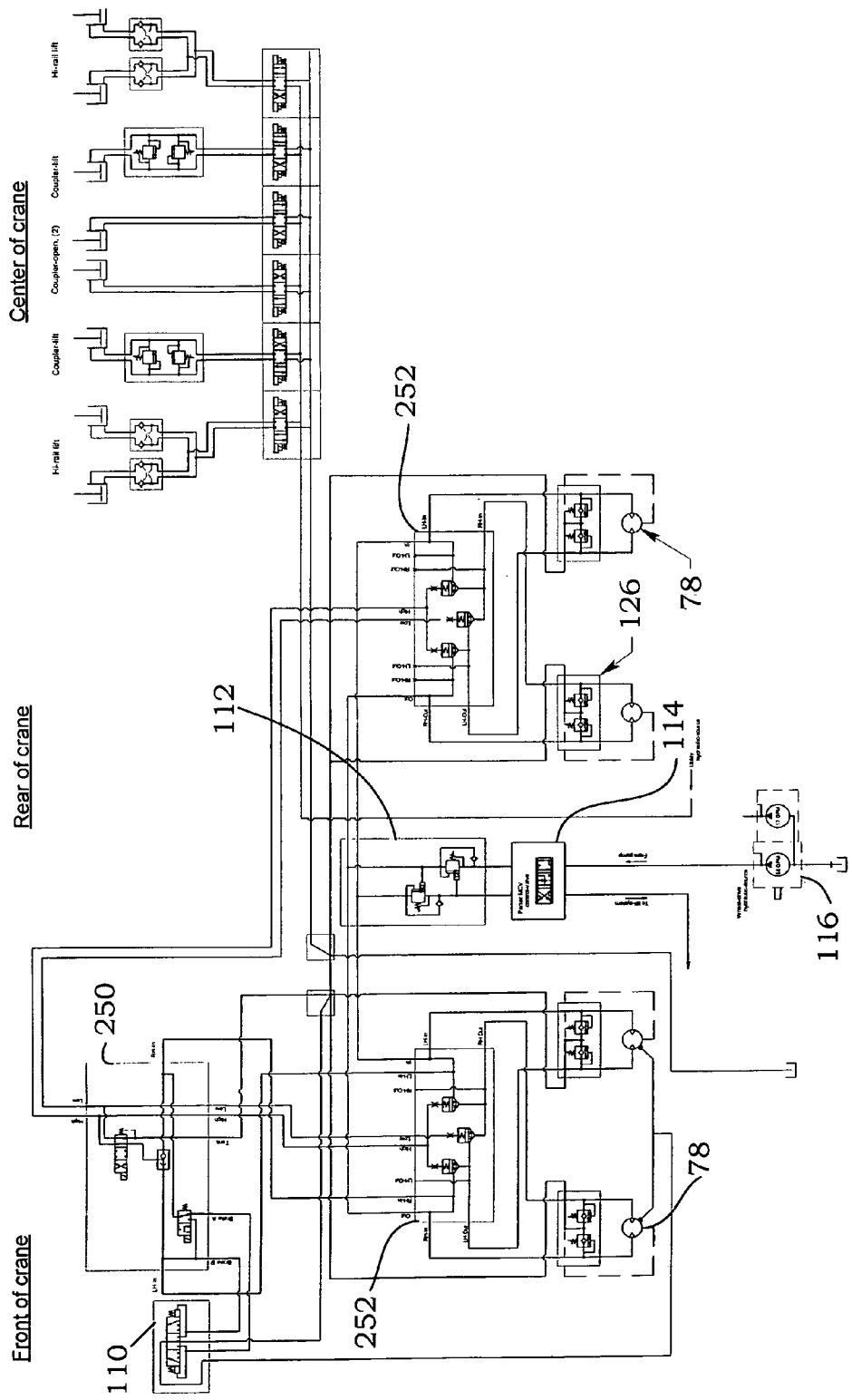
FIG. 18 is an alternate embodiment of a hydraulic schematic illustration of the hydrostatic hi-rail system of the present invention illustrating a dual-speed motor control.

Referring to FIG. 18, two speed ranges of operation are provided for the rail wheel drive system by the inclusion of hydraulic circuitry capable of switching the drive motor flow path on each end of the crane from a parallel configuration (low speed) to a series configuration (high speed). Shifting between speed ranges is accomplished hydraulically and can be done at any speed. The necessary circuitry consists of a master block 250, slave block 252 (one per end), and the associated hydraulic plumbing.

The primary function of the master block 250 is to provide control pressures necessary to operate the drive motor speed control function. Additionally, the master block provides control pressures necessary to operate the fail safe/emergency brake(s) described hereinabove. Control of both of these functions is accomplished using solenoid-controlled hydraulic valves.

The motor speed control function utilizes the higher of the two motor line pressures as a control pressure source. This pressure, obtained using a shuttle valve (cartridge type) is directed to one of two outlet ports (one each for high/low speeds) by a four-way, two-position solenoid valve. Control of the solenoid valve is initiated by the machine operator.

The emergency brake function utilizes the motor line pressures to provide two brake control pressure(s) necessary to hold the fail safe brakes 106 (front axle box only) in an unlocked configuration during normal wheel drive operation. These pressures are routed externally from the master block to a brake control valve 110. Also included is a three-way, two-position solenoid valve which functions to connect the two brake control pressures while simultaneously isolating both from the motor line pressures. As a result, the fail-safe brakes 106 are then applied as emergency brakes. Control of the solenoid valve is initiated by the machine operator.

The primary function of the slave block(s) 252 is to contain the hydraulic valving and circuitry necessary to switch the drive motor flow path configuration from parallel (low speed) to series (high speed) and vice-versa. Two slave blocks are included in the wheel drive system, one per end of the crane. The hydraulic valving in the slave blocks operate according to control pressures generated by the master block. These control pressures are transmitted simultaneously to both slave blocks by use of common pressure lines, thus ensuring drive motor speed range switching to occur simultaneously at both ends of the crane.

The slave blocks are machined from rectangular aluminum stock. The control valves are two-position, two-way slip-in cartridge valves. A valve recess machined to DIN 24342 standards is provided for each cartridge valve. A valve control cover (also manufactured to DIN standards) is provided to retain each cartridge valve. These covers utilize an internal orifice to control speed of valve actuation. The nominal flow capacity of each slave block is 106 gpm.

The invention claimed is:

1. In combination with a crane having a frame, a set of wheels for supporting the crane on a ground surface, a front and a rear outrigger box secured to the frame, an engine coupled to the wheels for propelling the crane on the surface, and a hydraulic pump coupled to the engine, a hydrostatic hi-rail system comprising:

a front lift assembly having a mounting structure secured to the front outrigger box, a pair of radius arms having free ends and pivotally secured to said mounting structure, a pair of hydraulic lift cylinders coupled to said mounting structure and said free ends of said radius arms, an axle box secured between said free ends of said radius arms, a pair of axially aligned rail wheels rotatably coupled to opposite ends of said axle box for engagement with a pair of spaced-apart railway rails, a pair of hydraulic motors mounted in said axle box and each having a drive shaft, a pair of removable drive axles coupled to said drive shafts and said rail wheels, and a pair of fail-safe brakes coupled to said pair of hydraulic motors, said fail-safe brakes movable between an engaged position thereby preventing rotation of said hydraulic motor and a released position thereby allowing rotation of said hydraulic motor, a rear lift assembly having a mounting structure secured to the rear outrigger box, a pair of radius arms having free ends and pivotally secured to said mounting structure, a pair of hydraulic lift cylinders coupled to said mounting structure and said free ends of said radius arms, an axle box secured between said free ends of said radius arms, a pair of axially aligned rail wheels rotatably coupled to opposite ends of said axle box for engagement with a pair of spaced-apart railway rails, a pair of hydraulic motors mounted in said axle box and each having a drive shaft, a pair of removable drive axles coupled to said drive shafts and said rail wheels, a front coupler slidably secured to said front lift assembly mounting structure and having a latch and a latch cylinder coupled to said latch, a front coupler lift cylinder coupled to said front coupler and said front lift assembly mounting structure, a rear coupler slidably secured to said rear lift assembly mounting structure and having a latch and a latch cylinder coupled to said latch, a rear coupler lift cylinder coupled to said rear coupler and said front lift assembly mounting structure, a wheel-drive hydraulic system coupled to the hydraulic pump and having a fail-safe brake control valve coupled to said fail-safe brakes, a wheel-drive braking valve coupled to said hydraulic motors and a wheel-drive control valve coupled to said hydraulic motors, said fail-safe brake control valve applying pressure to said fail-safe brakes to move said fail-safe brakes to said released position, said wheel-drive speed control valve having a low-speed position whereby each pair of hydraulic motors is coupled in parallel, a high-speed position whereby each pair of said hydraulic motors is coupled in serial, and a direction selection to rotate said motors in a forward direction and a reverse direction opposite said forward direction, a hi-rail utility hydraulic system coupled to the hydraulic pump and having a front hi-rail lift valve, a front coupler-lift valve coupled to said front coupler lift cylinder, a front coupler-latch valve coupled to said front coupler-latch cylinder, a rear hi-rail lift valve, a rear coupler-lift valve coupled to said rear coupler-latch cylinder, a pair of front lock valves coupled between said front hi-rail lift valve and said pair of front lift assembly hydraulic lift cylinders, and a pair of rear lock valves coupled between said front hi-rail lift valve and said pair of rear lift assembly hydraulic lift cylinders, a control system coupled to said hi-rail utility hydraulic system to selectively actuate said front and rear lift assembly hydraulic lift cylinders to pivot said radius arms between a first position and a second position to move said rail wheels from a stored position to an on-rail position engaging said rails thereby lifting the crane and crane wheels off of the ground surface and supporting the crane on said rail wheels on said railway rails, said control system coupled to said hi-rail utility hydraulic systems to selectively actuate said front and rear coupler lift cylinders to adjust the height of said front and rear couplers above the ground surface, and said front and rear latch cylinders to open and close said latches, said control system coupled to said wheel-drive hydraulic system to selectively actuate said hydraulic motors when said rail wheels are in said on-rail position to transport the crane along said railway rails in a selected direction and at a selected speed, whereby said control system selectively actuates said fail-safe control valve to place said front lift assembly fail-safe brakes in the engaged position to prevent the crane from rolling when transitioning from an on-ground position to a hi-rail position, said control system selectively actuating said hi-rail lift valve to actuate said hydraulic lift cylinders to lift the crane off of the ground surface and support the crane on the rail wheels on the railway rails, said control system selectively actuating said fail-safe control valve to place said fail-safe brake in the released position to allow rotation of the front lift assembly hydraulic motors and the rear lift assembly hydraulic motors, and said control system selectively actuating said wheel-drive speed control valve to rotate said front lift assembly hydraulic motors and said rear lift assembly hydraulic motors in a selected direction and at a selected speed.

\* \* \* \* \*